US012654114B2

(12) United States Patent
Ohno et al.

(10) Patent No.: US 12,654,114 B2
(45) Date of Patent: Jun. 16, 2026

(54) LIQUID-LIQUID EXTRACTION DEVICE

(71) Applicant: REFINE HOLDINGS CO., LTD.,
Gifu (JP)

(72) Inventors: Junya Ohno, Tokyo (JP); Hideki Ishizawa, Tokyo (JP); Tomokiyo Takeyama, Tokyo (JP); Akiyoshi Oda, Tokyo (JP); Hiroaki Takahashi, Tokyo (JP); Kouji Nakashima, Tokyo (JP); Tadashi Noumi, Tokyo (JP); Tomoya Fujita, Tokyo (JP); Mitsuhiro Iwafune, Tokyo (JP); Takao Suzuki, Tokyo (JP)

(73) Assignee: REFINE HOLDINGS CO., LTD.,
Gifu (JP)

( * ) Notice: Subject to any disclaimer, the term of this patent is extended or adjusted under 35 U.S.C. 154(b) by 291 days.

(21) Appl. No.: 18/565,688

(22) PCT Filed: May 31, 2022

(86) PCT No.: PCT/JP2022/022233
§ 371 (c)(1),
(2) Date: Nov. 30, 2023

(87) PCT Pub. No.: WO2022/255390
PCT Pub. Date: Dec. 8, 2022

(65) Prior Publication Data
US 2024/0269580 A1 Aug. 15, 2024

(30) Foreign Application Priority Data

Jun. 1, 2021 (JP) ................................. 2021-092033

(51) Int. Cl.
*B01D 11/04* (2006.01)
*B01D 11/00* (2006.01)

(52) U.S. Cl.
CPC .... *B01D 11/0465* (2013.01); *B01D 2011/002* (2013.01)

(58) Field of Classification Search
CPC .......... B01D 11/0465; B01D 2011/002; B01D 11/0438; B01D 11/0488
(Continued)

(56) References Cited

U.S. PATENT DOCUMENTS 3,174,831 A 3/1965 Kabisch et al.
4,321,856 A 3/1982 Gasc
(Continued)

FOREIGN PATENT DOCUMENTS

JP 55-94632 7/1980
JP 1-299603 12/1989
(Continued)

OTHER PUBLICATIONS

International Search Report issued in International Patent Application No. PCT/JP2022/022233, dated Jul. 26, 2022, along with an English translation thereof.

*Primary Examiner* — Ekandra S. Miller-Cruz
(74) *Attorney, Agent, or Firm* — Greenblum & Bernstein, P.L.C.

(57) ABSTRACT

A multi-tower liquid-liquid extraction apparatus having two or more extraction towers arranged in parallel. Each tower has a heavy-liquid supplying port at the top and a heavy-liquid discharging port at the bottom. Additionally, each tower has a light-liquid supplying port at the bottom and a light-liquid discharging port at the top. The heavy-liquid channels of the extraction towers are connected in series. Furthermore, at least two of the extraction towers are connected to respective diaphragm chambers through their respective piping. These diaphragm chambers have a closed space, part of the wall of which is formed by a diaphragm (Continued)

whose volume is changed by an operating drive section. The piping between each extraction tower and its respective diaphragm chamber is equipped with a pressure-regulating chamber and an on/off valve to regulate the internal pressure.

8 Claims, 2 Drawing Sheets

(58) Field of Classification Search
USPC ......................................................... 210/634
See application file for complete search history.

(56) References Cited

U.S. PATENT DOCUMENTS

| | | | |
|---|---|---|---|
| 4,985,141 | A | 1/1991 | Parker et al. |
| 8,360,750 | B2 * | 1/2013 | Ferk ...................... F04B 43/067 |
| | | | 417/404 |
| 2018/0033507 | A1 | 2/2018 | Bae et al. |

FOREIGN PATENT DOCUMENTS

| | | |
|---|---|---|
| JP | 5-192505 | 8/1993 |
| JP | 5-337304 | 12/1993 |
| JP | 7-31803 | 2/1995 |
| JP | 2018-15754 | 2/2018 |

* cited by examiner

LIQUID-LIQUID EXTRACTION DEVICE

TECHNICAL FIELD

Cross-Reference

This application claims priority to Patent Application No. 2021-92033 filed in Japan on Jun. 1, 2021, and the entire contents described in that application are incorporated by reference into this specification. In addition, all patents, patent applications, and documents cited in this specification are incorporated by reference into this specification in their entirety.

The present invention relates to a liquid-liquid extraction apparatus. Specifically, the present invention relates to a liquid-liquid extraction apparatus in which the height of the extraction tower is kept low, there are fewer restrictions on the place of installation, it is structurally simple, and it is capable of efficient extraction.

BACKGROUND TECHNOLOGY

Liquid-liquid extraction process is a process in which desired substances are extracted by transferring solutes dissolved in the solvent to other solvents for separation and purification. Compared to separation by distillation, adsorption, or absorption, this type of liquid-liquid extraction process is less efficient in terms of mass transfer, and the height of the extraction column used is higher to increase the contact efficiency and contact time between liquids, which creates restrictions in terms of installation.

In addition, from the viewpoint of substance transfer as described above, extraction columns with operating sections, such as MS columns, which are mixer-settler type continuous extraction units, and Karr columns, which operate the trays themselves, have been developed.

Since these extraction apparatus have an operating part inside the tower, which makes the mechanism complicated and has maintenance problems, as well as installation costs. On the other hand, packing towers for liquid-liquid extraction have a simple structure with packing materials and have advantages in terms of maintenance and installation cost, but they have the problem of poor liquid-liquid contact efficiency. On the other hand, packed towers for liquid-liquid extraction are simple structures filled with packing materials, which have advantages in terms of maintenance and installation cost, but suffer from low liquid-liquid contact efficiency.

In addition, as shown in the disclosures of Patent Literatures 1 to 3, for example, pulsating towers are also known as solvent extraction apparatuses primarily used for atomic feedstock recycling. Pulsating towers have the advantage that they can be operated continuously, and that the solvent retention time inside the pulsating tower is shorter, and therefore there is less radiation damage to the solvent. However, conventional pulsating (tapping) packed columns, although having good performance, have the problem of being prone to flooding and having a narrow operating range because the entire inside of the column is pulsating.

For example, in Patent Literature 4, a diaphragm pump installed outside the treatment tower is used to provide pulsation to the tower, and one of the discharge or suction portions of the diaphragm pump is blinded and the other is connected to the inside of the treatment tower. Thus, the internal fluid of the treatment tower is reciprocated. By using an external diaphragm pump to form the pulsation, a liquid-liquid extraction apparatus is disclosed that uses a simple method and is less expensive to install than a conventional pulsation tower. However, even with such a liquid-liquid extraction apparatus using a diaphragm pump, the above-mentioned issues of increasing the efficiency of contact between liquids and the residence time, as well as the height of the extraction tower and its installation restrictions, remain unresolved. In addition, although the device disclosed in Patent Literature 4 states that the volume of the diaphragm pump is selected based on the required pulse amplitude multiplied by the internal cross-sectional area of the pulsation column, there is no room for adjustment because the amplitude of the diaphragm cannot be adjusted, which leads to flooding in some extraction systems. This is still an issue that needs to be addressed.

PRIOR ART REFERENCES

Patent Literature

[Patent Literature 1] JP HEI 5 (1993)-192505A
[Patent Literature 2] JP HEI 5 (1993)-337304A
[Patent Literature 3] JP HEI 7 (1995)-31803A
[Patent Literature 4] JP 2018-15754A

SUMMARY OF INVENTION

Problem to be Solved

Accordingly, the subject matter of the present invention is to provide a liquid-liquid extraction apparatus realized to solve the above mentioned problems in the conventional technology. The subject matter of the present invention is also to provide a liquid-liquid extraction apparatus which can efficiently perform extraction, with keeping the height of the extraction tower low, having fewer restrictions on the installation place, and being structurally simpler.

The present invention for solving the above subject matter is a multi-tower liquid-liquid extraction apparatus having a plurality of extraction towers, characterized in that: n (n being an integer of 2 or more) extraction towers are arranged in parallel;

each extraction tower has a heavy liquid supply portion on the top side of the tower and a heavy liquid discharge portion on the bottom side of the tower, and, has a light liquid supply portion on the bottom side of the tower and a light liquid discharge portion on the top side of the tower;

(a) the heavy liquid discharge portion of the first extraction tower of the n extraction towers is connected via piping to the heavy liquid supply portion of the second extraction tower, the heavy liquid discharge portion of the second extraction tower is connected via piping to the heavy liquid supply portion of the third extraction tower, . . . the heavy liquid discharge portion of the $(n-1)^{th}$ extraction tower is connected via piping to the heavy liquid supply portion of the $n^{th}$ extraction tower, and in this way, heavy liquid channels of the n extraction towers are connected in series, and/or;

(b) the light liquid discharge portion of the $n^{th}$ extraction tower of the n extraction towers is connected to the light liquid supply portion of the $(n-1)^{th}$ extraction tower via piping, the light liquid discharge portion of the $(n-1)^{th}$ extraction tower is connected to the light liquid supply portion of the $(n-2)^{th}$ extraction tower via piping, . . . the light liquid discharge portion of the second extraction tower is connected to the light liquid supply portion of the first extraction tower via piping, and in this way the light liquid channels of the n extraction towers are connected in series, and;

at least two of these n respective extraction towers are connected to respective diaphragm chambers by respective piping, said diaphragm chambers having a closed space with a portion of its walls formed by a diaphragm, thereby volume of the closed space being changed by operation of a drive section;

the piping between each extraction tower and its respective diaphragm chamber is equipped with a pressure-regulating chamber and an on/off valve to adjust the internal pressure.

In an embodiment of the liquid-liquid extraction apparatus of the present invention, a modified diaphragm pump is used as the diaphragm chambers, wherein the modified diaphragm pump is formed by removing, from a diaphragm pump driven by electricity or compressed air with two chamber sections in which diaphragms forming walls of each chamber are operated alternately, check valves at inlet and outlet of each chamber, and blocking the outlet for one chamber section and the inlet for the other chamber section by a bulkhead, so that there is only one liquid flow path to each chamber section, and each chamber section is equipped with a nozzle for degassing, and the piping from the two extraction towers are connected to the improved diaphragm pump, respectively.

In an embodiment of the liquid-liquid extraction apparatus of the present invention, the n extraction towers are two extraction towers.

In one embodiment of the liquid-liquid extraction apparatus of the present invention, the amplitude of the extraction apparatus is adjustable from the pressure difference between the pressure at any position in the tower and the pressure in the pressure-regulating chamber, which is derived from the average density of the liquid and the height of the liquid level within each extraction tower.

In one embodiment of the liquid-liquid extraction apparatus of the present invention, pulsation of said extraction apparatus may be carried out in a manner that only one of the towers is pulsated by adjusting the pressure in the pressure adjustment chamber and the on/off valve.

In an embodiment of the liquid-liquid extraction apparatus of the present invention, the pulsation of said extraction apparatus can be varied in amplitude according to the respective extraction tower by individually adjusting the pressure in the pressure-regulating chamber.

In an embodiment of the liquid-liquid extraction apparatus of the present invention, each of said extraction towers has a gas-liquid interface at the top of the tower and is connected to each other through a pressure equalization pipe at the top of the column, and the pressure in the tower is uniform.

In an embodiment of the liquid-liquid extraction apparatus of the present invention, the n extraction towers are three or more extraction towers, and the adjacent extraction towers are each with three or more towers, or any two or more towers, connected through piping to the aforementioned modified diaphragm pump.

Effect of Invention

The liquid-liquid extraction apparatus of the present invention is a multi-tower liquid-liquid extraction apparatus with multiple extraction towers, which are arranged in parallel, so that even if it is necessary to increase the contact efficiency and residence time between liquids, the height can be reduced compared to a single extraction tower. Therefore, it is easy to install in existing facilities. In addition, in the liquid-liquid extraction apparatus of the present invention, the pulsator is not a pulsator with a complex mechanism, but it can be used by improving an existing diaphragm pump, and is therefore economically advantageous.

In addition, in the liquid-liquid extraction apparatus of the present invention, with respect to a plurality of extraction towers, the respective connecting portions of the piping between the tower and the diaphragm chamber can be provided at any place where pulsation is desired to be applied, and furthermore the amplitude and frequency of the pulsation can be adjusted arbitrarily, and thus it is possible to apply pulsation to only one tower. For example, if the first tower has a large concentration gradient and mass transfer is likely to occur, the first column can be run without pulsation, and pulsation can be given only to the second column for efficient extraction and to save the power of the pulsator.

Furthermore, in the liquid-liquid extraction apparatus of the present invention, it is possible, for example, to respond to changes even if the characteristics of the solution to be treated change by applying pulsation to the first tower to improve the extraction efficiency.

In addition, in the liquid-liquid extraction apparatus of the present invention, it is also possible to apply to the modification of an existing extraction tower by introducing a diaphragm chamber as a pulsator from the outside of the extraction tower.

In addition, in the liquid-liquid extraction apparatus of the present invention, for example, in a system in which the liquid is easily mixed with the liquid and the difference in specific gravity between the light liquid and the heavy liquid is small, in order to suppress an flooding phenomenon in which the liquid droplets do not drop or rise, and in a system in which the amplitude decreases and the difference in specific gravity between the light liquid and the heavy liquid is large, in order to suppress the liquid droplets from transferring too quickly, an adjustment to make the amplitude increase in frequency faster as well, and thus the range of the applicable system is broader.

Furthermore, in the liquid-liquid extraction apparatus of the present invention, for example, in a system in which the amount of substance transferred in the first tower is large, the liquid flow rate of the first tower is large compared to that of the second tower, and therefore, from the viewpoint of preventing an flooding, it is possible to carry out a correspondence in which the amplitudes of the first and second towers are varied, or in which the amplitude of the first tower only is stopped.

Furthermore, in the liquid-liquid extraction apparatus of the present invention, by adding an extraction tower and putting in a similar system, performance can be improved by only additional construction from the existing apparatus.

In addition, in the liquid-liquid extraction apparatus of the present invention, for example, it is easy to perform maintenance because a diaphragm chamber acting as a pulsator is mounted on the outside of the extraction tower, and it is easy to cope with a malfunction when it occurs because there is no operation section such as a Karr column or an RDC inside the extraction tower.

In addition, in the case where an extraction tower is used in various systems, a plurality of pipes and valves for applying pulsation to the extraction towers can be branched off from the pulsator in advance, and depending on the system, the position at which the pulsation is to be applied can be arbitrarily selected by operation of the valves, and the amplitude of the respective pulsation can also be freely controlled.

In addition, since the pulsator connected to the two towers does not mix the liquids in the pulsator, it is possible to use one or more towers to perform positive-extraction for separation of the components, and back-extraction for separation of the extracted substances from the extractant, respectively.

MODES FOR CARRYING OUT THE INVENTION

The invention is described in more detail below according to the embodiments.

Figure 1:
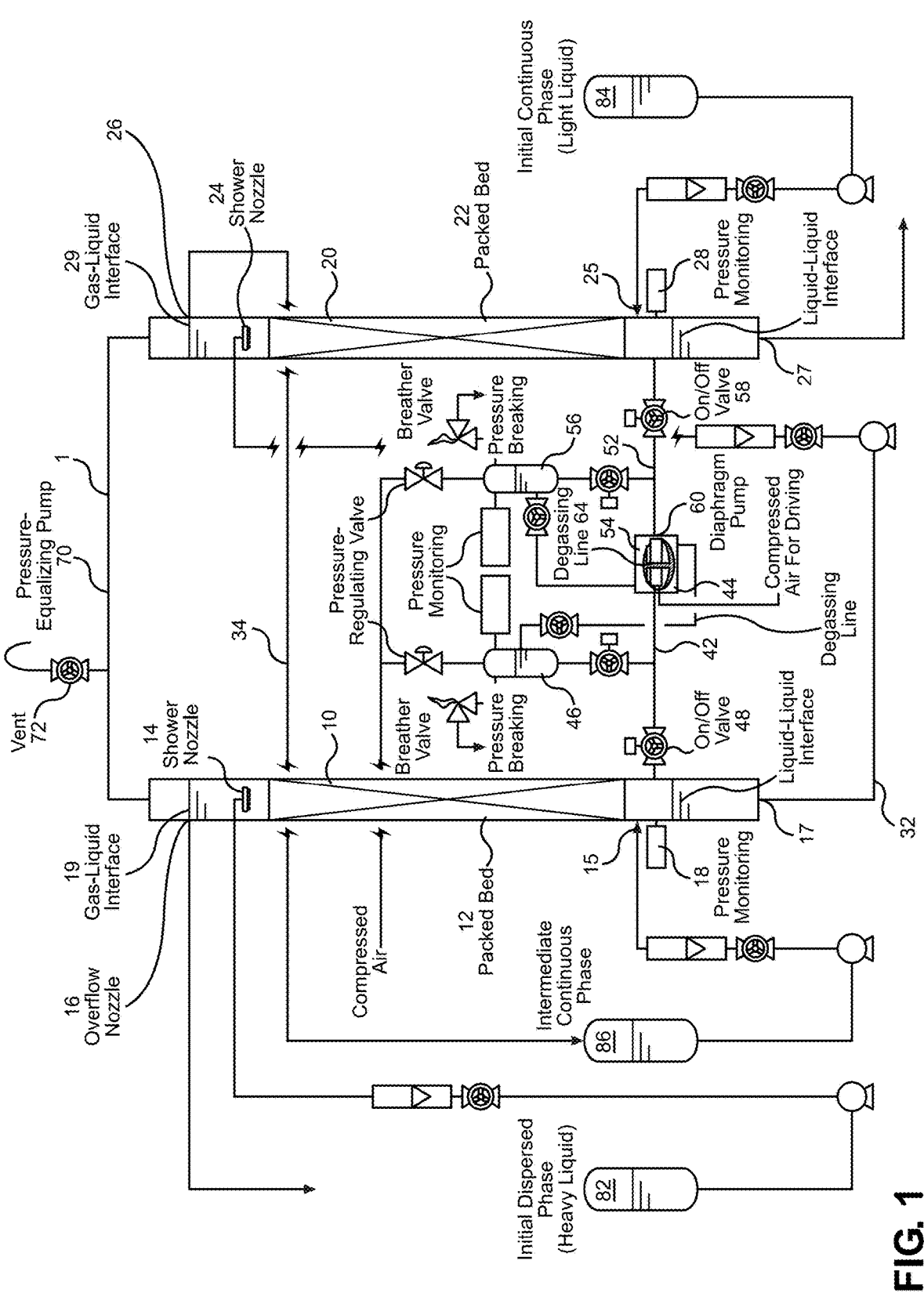
FIG. 1 is a schematic diagram of the overall configuration of an apparatus according to one embodiment of the liquid-liquid extraction apparatus of the present invention.
Figure 2:
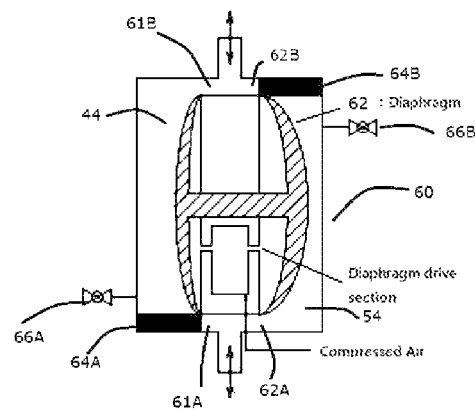
FIG. 2 is a schematic diagram of a modified diaphragm chamber structure used in an embodiment of the liquid-liquid extraction apparatus of the present invention.

FIG. 1 is a schematic diagram of the overall configuration of an apparatus according to one embodiment of the liquid-liquid extraction apparatus, and, FIG. 2 is a schematic diagram of a modified diaphragm chamber structure used in the apparatus of one embodiment of the liquid-liquid extraction apparatus of the present invention.

The liquid-liquid extraction apparatus of the present invention is a multi-tower liquid-liquid extraction apparatus having a plurality of extraction towers, where n (n is an integer of 2 or more) extraction towers are arranged in parallel.

In the embodiment shown in FIG. 1, a constitutive example of a side-by-side configuration of extracting towers 10, 20 with a minimum structure of two towers (n=2) in a multi-tower liquid-liquid extraction apparatus 1 of the present invention is illustrated, but the number of extracting towers (n) can of course be more than 3 in the liquid-liquid extraction apparatus 1 of the present invention. It should be noted that, although there is no special limitation, the number of n is usually, for example, from 2 to 4, or more preferably, from 2 to 3. Since multiple extraction towers are arranged in parallel, even if it is necessary to increase the contact efficiency and residence time between liquids, the height of the extraction column can be lower than that of a single extraction column, thus facilitating installation in existing facilities. In this specification, "arranged in parallel" means in a broad sense that each extraction column is arranged side by side against the installation surface when a certain installation location is assumed, and does not mean only the manner in which the position, interval, angle, etc. are strictly aligned. The "installation plane" usually consists of a single horizontal plane, but it may also have steps within the plane, curvature within the plane, or even a plane that is divided into multiple layers.

Because multiple extraction towers are arranged in parallel, even if it is necessary to increase the contact efficiency and residence time between liquids, the height can be lower than that of a single extraction column, making it easy to install in existing facilities.

In the liquid-liquid extraction apparatus of the present invention, each extraction tower has a heavy liquid supply portion on the top side of the tower and a heavy liquid discharge portion on the bottom side of the tower, and in addition, a light liquid supply portion on the bottom side of the tower and a light liquid discharge portion on the top side of the tower. In the embodiment shown in FIG. 1, in each of the extraction towers 10, 20, on the upper side (tower top side) of the fillers 12, 22 configured inside the tower, there are spray nozzles 14, 24 as the heavy liquid supply portion and overflow nozzles 16, 26 as the light liquid discharge portion, and at the cavity portion of the tower bottom on the lower side (tower bottom side) of the fillers, there are nozzles 15, 25 as the light liquid supply portion and drains 17, 26 as the heavy liquid discharge portion. There are no special restrictions on the shapes and strict configuration positions of the supply portion and the discharge portion as long as the extraction tower can function effectively.

In the liquid-liquid extraction apparatus of the present invention, in order to function as a multi-tower, it is necessary to fulfill:

(a) the heavy liquid discharge portion of the first extraction tower of the n extraction towers is connected via piping to the heavy liquid supply portion of the second extraction tower, the heavy liquid discharge portion of the second extraction tower is connected via piping to the heavy liquid supply portion of the third extraction tower, . . . the heavy liquid discharge portion of the $(n-1)^{th}$ extraction tower is connected via piping to the heavy liquid supply portion of the $n^{th}$ extraction tower, and in this way, heavy liquid channels of the n extraction towers are connected in series, and/or;

(b) the light liquid discharge portion of the $n^{th}$ extraction tower of the n extraction towers is connected to the light liquid supply portion of the $(n-1)^{th}$ extraction tower via piping, the light liquid discharge portion of the $(n-1)^{th}$ extraction tower is connected to the light liquid supply portion of the $(n-2)^{th}$ extraction tower via piping, . . . the light liquid discharge portion of the second extraction tower is connected to the light liquid supply portion of the first extraction tower via piping, and in this way the light liquid channels of the n extraction towers are connected in series.

In the embodiment shown in FIG. 1, this point is illustrated, (a) the heavy liquid discharge portion (drain) 17 of the first extraction tower 10 of the two extraction towers 10, 20 is connected to the heavy liquid supply portion (shower nozzle) 24 of the second extraction tower via piping 32, in such a manner that the heavy liquid channels of the two extraction towers are connected in series, and (b) the light liquid discharge portion (overflow nozzle) 26 of the second extraction tower 20 of the two extraction towers 10, 20 is connected to the light liquid supply portion (nozzle) 15 of the first extraction tower 10 via piping 34, in such a manner that the light liquid channels of the two extraction towers are connected in series.

In the embodiment shown in FIG. 1, the heavy liquid channel in (a) and the light liquid channel in (b) are both connected in series, but depending on the type of target product to be obtained by the extraction operation, only one of the heavy liquid channel in (a) or the light liquid channel in (b) may be connected in series.

In FIG. 1, symbol 82 denotes a heavy liquid tank, symbol 84 denotes a light liquid tank, and symbol 86 denotes a light liquid buffer tank.

Further, in the liquid-liquid extraction apparatus of the present invention, in the aspect of employing one or more towers for positive extraction for component separation, and for back-extraction for separation of extracted substances from an extractant, respectively, the number of extraction towers (n) of said conditions (a) and (b) is set to a value less than that total number (N) with respect to the total number (N) of extraction towers of the liquid-liquid extraction apparatus as a whole, in order to satisfy the heavy-liquid channels and/or the light-liquid channels in the serial connection configuration.

Moreover, in the liquid-liquid extraction apparatus of the present invention, at least two of these n respective extraction towers 10, 20 are connected via respective piping 42, 52 to respective diaphragm chambers 44, 54 having a closed space with a portion of the walls formed by a diaphragm. The volume of the closed space can be changed by the operation of a drive section.

The piping 42, 52 between each of the extraction towers 10, 20 and the respective diaphragm chambers 44, 54 is provided with pressure-regulating chambers 46, 56 and on/off valves 48, 58 that can adjust the internal pressure.

Thus, in one embodiment of the liquid-liquid extraction apparatus of the present invention, the pulsation of said extraction apparatus can pulsate only one of the towers by adjusting the pressure in the pressure-regulating chambers 46 and 56 and the on/off valves 48 and 58, respectively. Alternatively, the pulsation can be applied to each of the extraction towers 10, 20 individually, by adjusting the pressure in the pressure-regulating chambers 46, 56 separately.

Therefore, in the liquid-liquid extraction apparatus of the present invention, for example, in a system where the difference in specific gravity between light and heavy liquids is small and the liquids tend to mix, the amplitude can be reduced to suppress the flooding phenomenon in which the liquid droplets do not fall or rise. In a system where the difference in specific gravity between light and heavy liquids is large, the amplitude can be increased and the frequency can be increased to suppress the droplets from moving too fast. Thus the scope of the applicable system is wider.

In addition, in the liquid-liquid extraction apparatus of the present invention, for example, in a system in which the mass transfer rate is large in the first tower 10 is large, the liquid flow rate of the first tower is large compared to that of the second tower 20, and therefore, from the viewpoint of preventing the flooding, it is possible to carry out a correspondence in which the amplitudes of the first and second towers are varied, or in which the amplitude of the first tower only is stopped.

It should be noted that in the embodiment shown in FIG. 1, since there are only two extracting towers 10, 20 arranged in parallel in the liquid-liquid extraction apparatus, both extracting towers 10, 20 are connected to the diaphragm chambers 44, 54 via the piping 42, 52. In the liquid-liquid extraction apparatus of the present invention, however, in the embodiment where the number of extraction towers n is three or more, it is not necessary to have diaphragm chambers connected to all of the extraction columns. The diaphragm chambers may be connected to at least two of the three or more extraction columns. In other words, in another embodiment of the liquid-liquid extraction apparatus, the n extraction towers is three or more extraction towers, and the adjacent extraction towers are each with three or more towers, or any two or more towers can be connected through piping to the aforementioned improved diaphragm pumps. This is because the liquid-liquid extraction system of the present invention can achieve the desired action if it is configured to apply pulsation at the diaphragm chamber to at least two or more of the multiple extraction towers arranged in parallel.

In the liquid-liquid extraction apparatus of the present invention, the diaphragm chambers 44 and 54 that provide pulsation to each of the extraction columns 10 and 20 are not particularly limited as long as they have a closed space whose walls are partially formed by diaphragms and whose volume can be changed by operating a drive unit, as described above, to provide pulsation to each of the extraction towers 10 and 20. The multiple diaphragm chambers 44 and 54 may be independent of each other. In the liquid-liquid extraction system, since the diaphragm chambers as pulsators are installed outside of the extraction columns 10 and 20, maintenance is easy, and since there are no operating parts inside the extraction columns, such as Karr columns and RDCs, it is easy to cope with a malfunction in the event of a malfunction.

In one preferred embodiment of the liquid-liquid extraction apparatus, as shown in FIGS. 1 and 2, said diaphragm chambers 44 and 54 are manufactured by improving a diaphragm pump 60 driven by electricity or compressed air with two chamber sections in which diaphragms forming walls of each chamber are operated alternately. Namely, by removing check valves (not shown) at flow inlets 61A and 61B and flow outlets 62A and 62B of the diaphragm pump 60, and blocking the flow outlet 61A of one chamber section 44 and the flow inlet 62B of the other chamber section 54 with bulkheads 64A and 64B, only one liquid flow path in each chamber section is provided. Further, gas release nozzles 66A, 66B are added to each of the chamber sections 61A, 61B. The piping 42, 52 from the two extraction towers are connected to the chamber sections of the diaphragm pump, respectively. By adopting this structure, it is possible to apply pulsation to a plurality of extraction towers by operating a single diaphragm pump, and thus it is possible to reduce the volume of the apparatus and realize an economical apparatus structure. In addition, the desired structure can be obtained by simple modification of existing diaphragm pumps, thus allowing easy manufacturing of the apparatus.

As the above-described modified diaphragm pump 60 as the pulsator connected to the two towers used in the preferred embodiment of the liquid-liquid extraction apparatus of the present invention, since the liquids do not mix between the two diaphragm chambers 44 and 54 inside thereof, it is possible to use one or more towers to perform the positive extraction for the separation of the components, and other one or more towers to the back-extraction for the separation of the extracted substances from the extractant, respectively.

In one embodiment shown in FIG. 1, a diaphragm pump 60 with the prescribed modification as described above is connected to the two extraction towers 10 and 20 by their respective piping 42 and 52 in a ratio of one diaphragm pump 60 for each of the two extraction towers 10 and 20. In another embodiment of the liquid-liquid extraction apparatus of the present invention in which the number of extraction towers (n) arranged in the apparatus is three or more, when the diaphragm chambers which provide pulsation to each extraction tower are configured by a diaphragm pump 60 with the predetermined modification as described above, the same configuration as the embodiment illustrated in FIG. 1, in which a diaphragm pump 60 with the prescribed modification as described above is connected to two extraction towers by their respective piping in the ratio of one diaphragm pump for two extraction towers, i.e., one diaphragm pump 60 for each of the two extraction towers, may be applicable. Alternatively, the apparatus can be configured so that one diaphragm pump is connected to three or more extraction towers by branching off one or both of the two piping 42 and 52 that are connected to one diaphragm pump 60, so as to provide pulsation to each extraction tower. When each of the piping 42 and 52 is branched and connected to multiple extraction towers in this manner, in order to be able to provide independent pulsation to each of the multiple extraction towers, on/off means such as on/off valves can be provided at each of the branches, and by opening/closing these means, pulsation transmission from any of the chamber sections 44 and 54 of the diaphragm pumps 60 to an intended extraction tower can be switched.

In the embodiment in which one diaphragm pump is connected to three or more extraction towers by branching one or both of the two piping 42 and 52 that are connected to the diaphragm pump 60, the pressure-regulating chambers as the chambers 46 and 56 provided in the middle of the piping as shown in FIG. 1 can also be provided in the middle of each of the branching piping to correspond to each extraction tower. Alternatively, one pressure-regulating chamber can be positioned closer to the diaphragm pump than the branching piping, so as to correspond to multiple extraction towers.

In the liquid-liquid extraction apparatus of the present invention, multiple piping and valves can be installed by branching off from the diaphragm pump 60 as the pulsator in advance to apply pulsation to the extraction towers. Depending on the system, the position at which the pulsation is applied can be selected arbitrarily by operating the valves, and the amplitude of each pulsation can be controlled as desired.

In one embodiment of the liquid-liquid extraction apparatus of the present invention shown in FIG. 1, for both extraction towers 10 and 20, the connection position to the piping 42 or 52 which is provided between the diaphragm chamber 44 or 54 and the extraction tower 10 or 20 is located at the bottom of the tower. However, in the liquid-liquid extraction apparatus, for each of multiple extraction towers, the connection position to the piping 42 or 52 between the respective diaphragm chamber 44 or 54 and the respective extraction tower is not particularly limited, and can be set at any location where pulsation is desired, and can be similar or different for each extraction tower.

Furthermore, in one embodiment of the liquid-liquid extraction apparatus of the present invention shown in FIG. 1, each of said extraction towers 10, 20 has a gas-liquid interface 19, 29 at the top of the tower, and the interfaces are connected at the top of the tower through a pressure-equalizing pipe 70, respectively, so that the pressure in each tower is uniform. In FIG. 1, symbol 72 indicates a vent provided on the piping of the pressure-equalizing pipe 70. In this way, by connecting all or a part of a plurality of extraction towers in the liquid-liquid extraction apparatus of the present invention through the pressure-equalizing pipe 70, and by making the pressure in each of the connected towers uniform, such plurality of extraction towers with uniform pressure can be used instead of a single extraction tower with a higher height, and it is possible to carry out the same extraction operation by such plurality of extraction towers with lower height.

Example

Hereinafter, the present invention is more specifically described based on examples.

FIG. 1 is a schematic diagram showing the overall configuration of the extraction apparatus used in the example, and FIG. 2 is a schematic diagram showing the structure of the diaphragm pump used in the example.

In FIG. 1, as extraction towers 10, 20, two extraction towers with a tower diameter of 65 mm and a height of 6 m were prepared, each of which was packed with a random packing of a corrosion-resistant metal having a specific surface area of 435 $m^2/m^3$ to form a 4 m packed bed 12, 22 in a state where the top and bottom of the towers were empty by 1 m. The upper side of the packing bed 12, 22 was provided with spray nozzles 14, 24 for supplying heavy liquids and overflow nozzles 16, 26 for discharging light liquids. The lower side of the packing bed was provided with pressure indicators 18, 28 for monitoring the pressure. Further, a modified pneumatic diaphragm pump 60, where a pneumatic diaphragm pump for delivering liquids driven by compressed air as the driving source was modified by removing check valves, and providing the bulkheads 64A and 64B to the channels 44 and 54 in the pump as shown in FIG. 2, was connected to the two towers by means of piping 42, 52 at the lower side of the packing bed in the towers.

A heavy liquid was made up of 20% formic acid as the component to be extracted, 15% inorganic salt as the other component dissolved, and the rest was aqueous medium, while a mixed light liquid was prepared with tributyl phosphate (TBP) as the extractant and n-decane as the diluting solvent of the extractant in the mass ratio (TBP:decane=) 3:1. The density of the heavy liquid was 1190 $kg/m^3$ and the light liquid was 900 $kg/m^3$.

To make the heavy liquid a dispersed phase, shower nozzles 14 and 24 having a nozzle aperture of 1.5 mm in diameter and a number of holes of 10 were used to supply heavy liquid to each of the towers 10 and 20.

To make the mixture of extractant and diluting solvent a light liquid (continuous phase), nozzles 15 and 25 for liquid supply were provided in the cavity at the bottom of the tower, and the mixture was fed from there and drained from overflow nozzles 16 and 26 at the top of the towers, the outlet of the continuous phase.

For continuous countercurrent liquid-liquid extraction using two towers, heavy liquid as a dispersed phase was supplied from the first tower (left tower in the FIG. 10, heavy liquid extracted from the bottom of the first tower was supplied as a dispersed phase to the second tower (right tower in the FIG. 20, liquid discharged from the bottom of the second tower was supplied as a post-processed heavy liquid, and light liquid as a continuous phase was supplied from the bottom of the second tower, and light liquid discharged from the overflow nozzles 26 of the second tower was received temporarily in the buffer tank 86, then, this liquid was supplied to the bottom of the first tower, and the liquid discharged from the overflow nozzle 16 of the first tower was supplied as a post-processed light liquid.

Comparative Example 1: No Pulsation

The extraction process was performed without running the diaphragm pump. The holdings were pre-loaded into the tower, and data were measured as a steady state when the feed rate of light and heavy liquids reached five times the volume of the column.

The flow rate of the light liquid was twice the flow rate of the heavy liquid in terms of the mass ratio. As a result, the following composition was obtained.

TABLE 1

| | Moisture compo-sition | Formic acid compo-sition | salt compo-sition | extraction agent + diluent compo-sition | Capacity kg/h |
|---|---|---|---|---|---|
| Pre-processed light liquid | 0 | 0 | 0 | 1.000 | 200 |
| Pre-processed heavy liquids | 0.65 | 0.2 | 0.15 | 0 | 100 |
| Post-processed light liquids | 0.025 | 0.082 | 0 | 0.893 | 224 |
| Post-processed Heavy Liquid | 0.781 | 0.022 | 0.197 | 0 | 76 |

The formic acid recovery from the heavy liquid under this condition was 91.8%.

Example 1: With Pulsation Only in the Second Tower

First, gas was removed from the gas release line of the diaphragm while supplying liquid from the tower into the diaphragm to fill the diaphragm pump 30 with liquid. Then, pulsation was applied to the second tower 20 only. The volume pushed by the diaphragm was 80 ml, and the porosity of the packed bed was 98%. The liquid level moved about 5 cm per beat (amplitude). The frequency was set to 30 Hz, and the other conditions were the same as those of the no-pulsation.

As a result, the following composition was obtained.

TABLE 2

| | Moisture compo-sition | Formic acid compo-sition | salt compo-sition | extraction agent + diluent compo-sition | Capacity kg/h |
|---|---|---|---|---|---|
| Pre-processed light liquid | 0 | 0 | 0 | 1.000 | 200 |
| Pre-processed heavy liquids | 0.65 | 0.2 | 0.15 | 0 | 100 |
| Post-processed light liquids | 0.025 | 0.089 | 0 | 0.886 | 225 |
| Post-processed Heavy Liquid | 0.792 | 0.008 | 0.2 | 0 | 75 |

Example 2: First Tower with Pulsation, Same Pulsation Conditions as in Example 1

Pulsation was also applied to the first tower as well. Other than this, an experiment was conducted under the same conditions as in Example 1. As a result, it was difficult for the heavy liquid to drop to the bottom of the first tower which was the dispersed phase, and a phenomenon of stagnation in the tower (flooding) occurred. This phenomenon was detected by the pressure in the tower. Since the first tower has a supply port for the heavy liquid phase and a supply port from the light liquid phase discharge port of the second tower, the amount of formic acid was increased, and as a result, the flow rate of the liquid to be processed was increased as compared with the second tower, and it was difficult for the heavy liquid as the dispersed phase to drip down due to the effect of pulsation, and the flooding occurred as a result.

Example 3: Pulsation in Both Towers, the Amplitude of the Pulsation Changed to Half A damper was used and operated with the amplitude of the conditions in Example 2 set to half (2.5 cm) for both towers, while adjusting the pressure in the damper by the amount of compressed air introduced, and operation was performed. As a result, the following composition was obtained.

TABLE 3

| | Moisture compo-sition | Formic acid compo-sition | salt compo-sition | extraction agent + diluent compo-sition | Capacity kg/h |
|---|---|---|---|---|---|
| Pre-processed light liquid | 0 | 0 | 0 | 1.000 | 200 |
| Pre-processed heavy liquids | 0.65 | 0.2 | 0.15 | 0 | 100 |
| Post-processed light liquids | 0.025 | 0.088 | 0 | 0.887 | 226 |
| Post-processed Heavy Liquid | 0.797 | 0.001 | 0.202 | 0 | 74 |

The concentration of formic acid in the post-processed heavy liquid decreased to 0.001 in terms of the mass fraction. Formic acid recovery was 99.6.

DESCRIPTION OF SYMBOLS

10, 20: Extraction tower
12, 22: Packing bed
14, 24: Shower nozzle
15, 25: Nozzle
16, 26: Overflow nozzle
17, 27: Drain
44, 54: Diaphragm chamber
60: Diaphragm pump
64A, 64B: Bulkhead
66A, 66B: Gas release nozzle

What is claimed is:

1. A multi-tower liquid-liquid extraction apparatus comprising a plurality of extraction towers, n (n being an integer of 2 or more) extraction towers being arranged in parallel;
   each extraction tower comprising a heavy liquid supply portion on the top side of the extraction tower and a heavy liquid discharge portion on the bottom side of the extraction tower, and, comprising a light liquid supply portion on the bottom side of the extraction tower and a light liquid discharge portion on the top side of the extraction tower;
   (a) the heavy liquid discharge portion of the first extraction tower of the n extraction towers being connected through first piping to the heavy liquid supply portion of the second extraction tower, the heavy liquid discharge portion of the second extraction tower being connected through second piping to the heavy liquid supply portion of the third extraction tower, the heavy liquid discharge portion of the $(n-1)^{th}$ extraction tower being connected through heavy liquid piping to the heavy liquid supply portion of the $n^{th}$ extraction tower, and in this way, heavy liquid channels of the n extraction towers being connected in series, or;
   (b) the light liquid discharge portion of the $n^{th}$ extraction tower of the n extraction towers being connected to the light liquid supply portion of the $(n-1)^{th}$ extraction tower through third piping, the light liquid discharge portion of the $(n-1)^{th}$ extraction tower being connected to the light liquid supply portion of the $(n-2)^{th}$ extraction tower through fourth piping, the light liquid discharge portion of the second extraction tower being connected to the light liquid supply portion of the first extraction tower through light liquid piping, and in this way light liquid channels of the n extraction towers being connected in series, and;

at least two of these n respective extraction towers being connected to respective diaphragm chambers by respective piping, said diaphragm chambers having a closed space with a portion of walls formed by a diaphragm, thereby volume of the closed space being changed by operation of a drive section; the respective piping between each extraction tower and the respective diaphragm chamber being equipped with a pressure-regulating chamber and an on/off valve to adjust the internal pressure.

2. The liquid-liquid extraction apparatus according to claim 1, wherein a modified diaphragm pump is used as the diaphragm chambers, the modified diaphragm pump being formed by removing, from a diaphragm pump driven by electricity or compressed air with two chamber sections in which diaphragms forming walls of each chamber are operated alternately, check valves at inlet and outlet of each chamber, and blocking the outlet for one chamber section and the inlet for the other chamber section by a bulkhead, thereby providing only one liquid flow path to each chamber section, and each chamber section being equipped with a nozzle for degassing, and the respective piping from the two extraction towers are connected to the modified diaphragm pump, respectively.

3. The liquid-liquid extraction apparatus according to claim 1, wherein the n extraction towers are two extraction towers.

4. The liquid-liquid extraction apparatus according to claim 1, wherein an amplitude of the extraction apparatus is adjustable from the pressure difference between the pressure at any position in the extraction tower and the pressure in the pressure-regulating chamber, which is derived from the average density of the liquid and the height of the liquid level within each extraction tower.

5. The liquid-liquid extraction apparatus according to claim 1, wherein pulsation of said extraction apparatus is carried out in a manner that only one of the extraction towers is pulsated by adjusting the pressure in the pressure adjustment chamber and the on/off valve.

6. The liquid-liquid extraction apparatus according to claim 1, wherein pulsation of said extraction apparatus is varied in amplitude according to the respective extraction tower by individually adjusting the pressure in the pressure-regulating chamber.

7. The liquid-liquid extraction apparatus according to claim 1, wherein each of said extraction towers has a gas-liquid interface at the top of the tower and is connected to each other through a pressure equalization pipe at the top of the column, and the pressure in the tower is uniform.

8. A liquid-liquid extraction apparatus according to claim 2, wherein the n extraction towers are three or more extraction towers, and adjacent extraction towers are each with three or more extraction towers, or two or more extraction towers, connected through respective piping to the modified diaphragm pump.

* * * * *